(12) United States Patent
Kelley

(10) Patent No.: US 7,088,103 B2
(45) Date of Patent: Aug. 8, 2006

(54) METAL DETECTOR HAVING A PLURALITY OF PHASE DELAY DISCRIMINATION REGIONS WITH CORRESPONDING SELECTABLE EXCEPTION SPACES THEREIN

(75) Inventor: Anne Kelley, Corvallis, OR (US)

(73) Assignee: White's Electronics, Inc., Sweet Home, OR (US)

( * ) Notice: Subject to any disclaimer, the term of this patent is extended or adjusted under 35 U.S.C. 154(b) by 75 days.

(21) Appl. No.: 10/843,719

(22) Filed: May 11, 2004

(65) Prior Publication Data

US 2004/0183537 A1  Sep. 23, 2004

(51) Int. Cl.
  *G01V 3/08* (2006.01)
  *G01V 3/10* (2006.01)
  *G01V 3/15* (2006.01)
(52) U.S. Cl. .................................... 324/326; 324/329
(58) Field of Classification Search ............... 324/326, 324/329, 323, 228, 234, 239, 243; 340/551, 340/540, 568.1, 686.6
See application file for complete search history.

(56) References Cited

U.S. PATENT DOCUMENTS

| | | | | |
|---|---|---|---|---|
| 4,099,116 | A | * | 7/1978 | Tyndall ........................ 324/329 |
| 4,303,879 | A | | 12/1981 | Podhrasky |
| 4,486,713 | A | * | 12/1984 | Gifford ........................ 324/329 |
| 4,507,612 | A | | 3/1985 | Payne |
| 4,677,384 | A | | 6/1987 | Payne |
| 4,700,139 | A | | 10/1987 | Podhrasky |
| 4,868,910 | A | | 9/1989 | Maulding |
| 5,148,151 | A | | 9/1992 | Podhrasky |
| 5,523,690 | A | * | 6/1996 | Rowan ........................ 324/329 |
| 5,786,696 | A | * | 7/1998 | Weaver et al. ............... 324/329 |
| 6,172,504 | B1 | | 1/2001 | Earle |
| 6,421,621 | B1 | | 7/2002 | Earle |
| 6,541,966 | B1 | | 4/2003 | Keene |
| 6,586,938 | B1 | * | 7/2003 | Paltoglou ..................... 324/329 |
| 6,911,823 | B1 | * | 6/2005 | Rowan ........................ 324/326 |

\* cited by examiner

*Primary Examiner*—Bot Ledynh
*Assistant Examiner*—Kenneth J. Whittington
(74) *Attorney, Agent, or Firm*—Birdwell & Janke, LLP

(57) ABSTRACT

A metal detector having a plurality of phase delay discrimination regions with corresponding selectable exception spaces therein. A metal detector for indicating the presence of a metal target, comprising a transmitting module for transmitting a time-varying electromagnetic wave to the target, a receiving module for receiving said wave as modified by the target, an analyzing module for determining the phase delay of the modified said wave and providing a characterization to a user of the target based on said phase delay, said analyzing module being further adapted in a normal mode of operation of the metal detector to report said characterization to the user in a circumstance (a) wherein said phase delay exceeds a predetermined discrimination level and to not report said characterization to the user in a circumstance (b) wherein said phase delay does not exceed said discrimination level, and an exception space circuit cooperating with said analyzing module for comparing said phase delay with a limited range of one or more predetermined values for said phase delay and, in a first exception space mode of operation of the metal detector, causing said analyzing module to not report said characterization in said circumstance (a) when said range of values exceeds said discrimination level and, in a second exception space mode of operation of the metal detector, report said characterization in circumstance (b) wherein said range of values does not exceed said discrimination level, is provided.

20 Claims, 4 Drawing Sheets

METAL DETECTOR HAVING A PLURALITY OF PHASE DELAY DISCRIMINATION REGIONS WITH CORRESPONDING SELECTABLE EXCEPTION SPACES THEREIN

FIELD OF THE INVENTION

This invention relates to a metal detector having a plurality of phase delay discrimination regions with corresponding exception spaces therein.

BACKGROUND

Metal detectors are used in a variety of applications for the detecting and reporting of metallic objects otherwise hidden from view by soil, clothing, packing materials, water, etc. As well as law enforcement and military applications, metal detectors find use by hobbyists, historians and others who search for artifacts or natural metallic objects in soil or underwater.

In most applications, it is very useful for the operator of a metal detector to be able to obtain information about the composition of a metal object from the response of the detector, without having to dig or search for the object in order to identify it. For instance, a hobbyist or historian searching for silver coins in the area of an old treasure trove would be uninterested in the detection of beer can pull tabs, and would prefer not to waste time digging out the large number of uninteresting and undesired, or "junk", targets. Thus it is desirable for metal detectors to incorporate features allowing at least preliminary identification of what a metallic object might be. Such preliminary identification might include factors such as the material of composition, the size or shape of the object, and the depth or distance of the object from the detector, among others.

Since many of the kinds of metallic objects that are found are of similar size and shape (e.g. coins vs. pull tabs) and are found a similar depths in soil, the material composing the metallic object is an important factor in ascertaining whether to invest the effort to exhume the detected object.

Metal detectors can obtain information about the composition of metallic objects by means of the different responses of various metallic elements, alloys, and compounds to the electrical signals generated by metal detectors. The principle of operation of metal detectors of the present "induction" type involves the production and transmission of a time-varying, or alternating, electromagnetic wave and the detection of a responsive electromagnetic wave that is induced in metallic objects that are located near the detector by the transmitted energy. Different metallic substances, due to their differing physical properties, cause differing degrees of delay in the phase of the induced time-varying electromagnetic wave as detected by the receiving apparatus of the metal detector. While the material composing a metallic object does not unambiguously define what the object is, it does allow for objects unlikely to be of interest to be rejected and others to be identified as worthy of attempts at recovery.

Various metallic elements (copper, etc.), alloys (stainless steel, etc.) and compounds (ferrous salts, etc.) delay the phase of an induced oscillating electromagnetic field to differing degrees; for instance nickel coins and aluminum foil delay the phase less than do copper pennies and pull tabs, which delay less than do dimes and quarters. Thus, some items of usual interest such as dimes and quarters are relatively easy to distinguish from aluminum foil, and it is known to design a metal detector with a settable threshold function that would report dimes and quarters but not report aluminum foil, based on the widely separated positions of these objects on the phase delay scale. However, other objects of potential interest such as nickels lie on the phase delay scale between objects that would likely be regarded as junk targets such as aluminum foil and beverage can pull tabs.

The prior art has not squarely addressed this problem. For example, U.S. Pat. No. 4,700,139 permits a user to define a single excluding region of phase delay within which a target will not be reported. U.S. Pat. No. 5,148,151 requires the user to pre-program the detector regarding accept or reject criteria for all regions of the phase delay scale in which the user desires to make a specification.

U.S. Pat. No. 4,677,384 provides a discriminate circuit that can be overridden by a target select circuit that allows reporting of target information that would otherwise be suppressed as not falling within an acceptable range of phase delay. However, it is not recognized that it is often desirable to suppress the reporting of target information that otherwise would be reported as falling within the acceptable range of phase delay.

It is a further problem not addressed by the prior art that the user involvement in defining accept and reject criteria has risen in complexity in proportion to the amount of definition required. Accordingly, there is a need for a metal detector having a plurality of discrimination regions with corresponding exception spaces therein that provides for easily defining relatively complex discrimination criteria.

SUMMARY OF THE INVENTION

According to the present invention, a metal detector having a plurality of phase delay discrimination regions with corresponding selectable exception spaces therein is provided. A metal detector for indicating the presence of a metallic target, comprising a transmitting module for transmitting a time-varying electromagnetic wave to the target, a receiving module for receiving said wave as modified by the target, an analyzing module for determining the phase delay of the modified said wave and providing a characterization to a user of the target based on said phase delay, said analyzing module being further adapted in a normal mode of operation of the metal detector to report said characterization to the user in a circumstance (a) wherein said phase delay exceeds a predetermined discrimination level and to not report said characterization to the user in a circumstance (b) wherein said phase delay does not exceed said discrimination level, and an exception space circuit cooperating with said analyzing module for comparing said phase delay with a limited range of one or more predetermined values for said phase delay and, in a first exception space mode of operation of the metal detector, causing said analyzing module to not report said characterization in said circumstance (a) when said range of values exceeds said discrimination level and, in a second exception space mode of operation of the metal detector, report said characterization in circumstance (b) wherein said range of values does not exceed said discrimination level, is provided.

DETAILED DESCRIPTION OF THE PREFERRED EMBODIMENT

Figure 1:
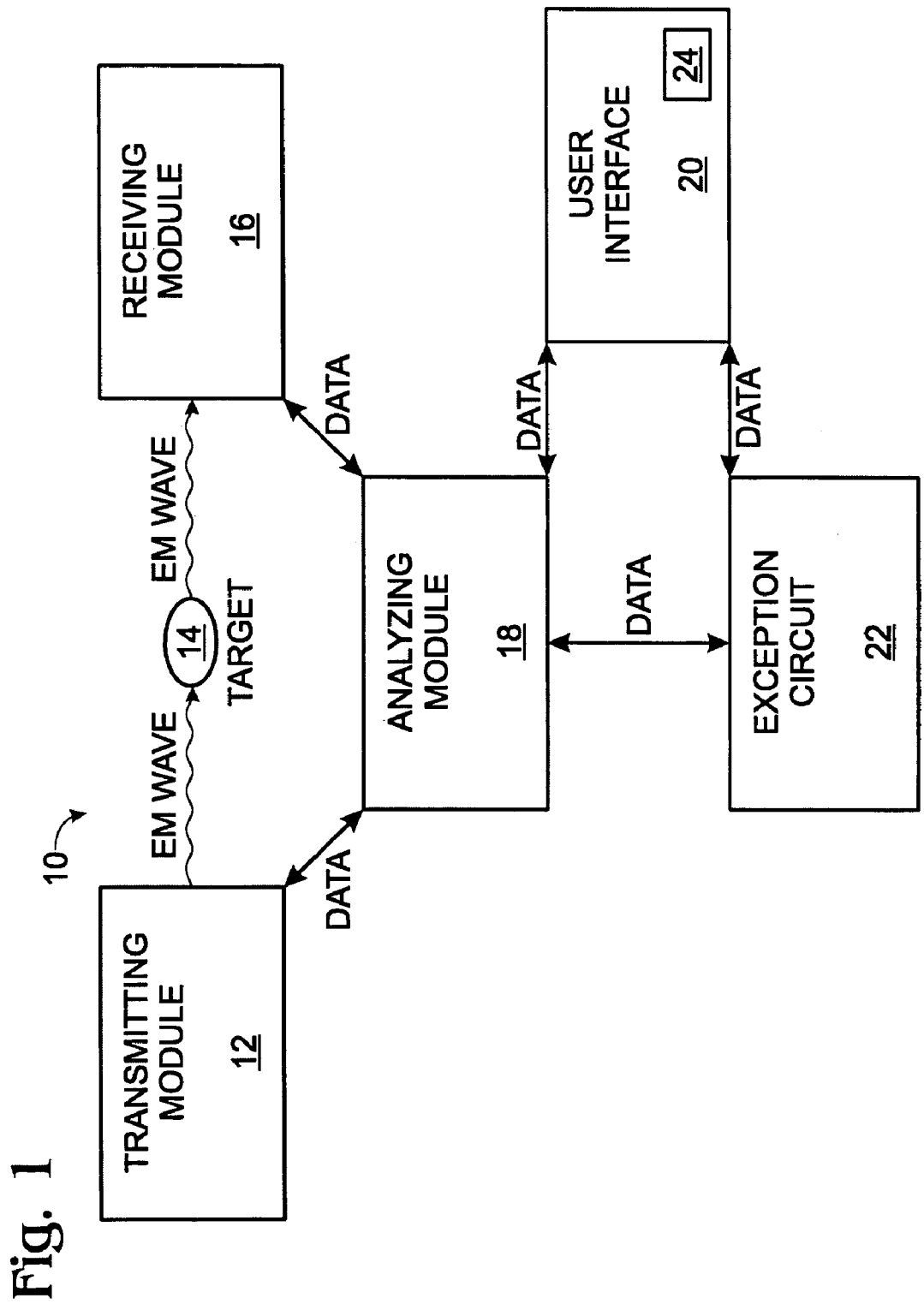
FIG. 1 is a block diagram of a metal detector according to the present invention.

FIG. 1 is a block diagram of a typical hobbyist type metal detector 10 suitable for use in conjunction with the present invention, also showing the data flow between the various modules of the metal detector. The metal detector 10 includes a transmitting module 12 for transmitting a time-varying electromagnetic wave to a target 14. The target 14 is typically buried in the ground, but may be out of visible range for any other reason. The electromagnetic wave interacts with the target, such as by being reflected, absorbed, and re-radiated, and is thereby modified by the target.

The metal detector also includes a receiving module 16 for receiving the wave as modified. The metal detector 10 may be either of the continuous wave or induction type, or of the pulse type. Where the metal detector is of the induction type, the electromagnetic wave is modified by being phase delayed and reduced in amplitude. Where the metal detector is of the pulse type, the wave comprises one or more discrete pulses that are delayed and modified in shape in both time and amplitude dimensions.

The metal detector 10 further includes an analyzing module 18 for determining the phase delay of the modified wave and characterizing the phase delay relative to a standard, the standard typically being defined as 0 degrees for the phase delay characteristic of a ferrite powder. The phase delay being a function of the type of metal or metals in the target, knowing the phase delay difference relative to a standard provides a means for discriminating between metal targets of differing compositions. Based on these data, the analyzing module 18 also characterizes the type of target based on the phase delay difference relative to the standard.

The metal detector 10 also includes a user interface 20 (FIG. 1) by which the detector 10 may report target characterizations to the operator subject to conditions discussed immediately below. The interface 20 may include indicator lights, speakers, a one- or two-dimensional graphics display, or a combination thereof.

Figure 2:
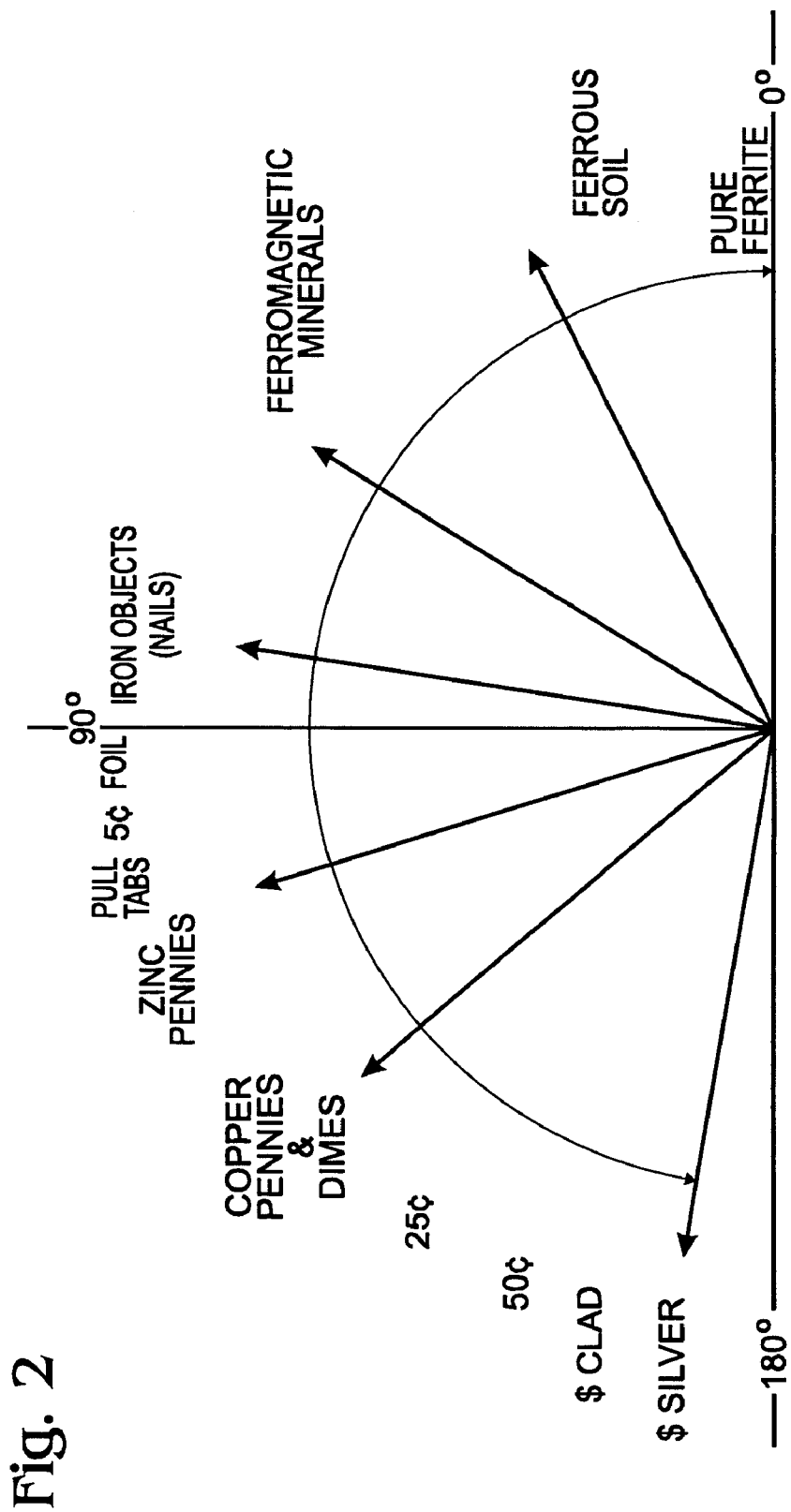
FIG. 2 is a diagram of a phase delay scale plotted with respect to Cartesian axes showing where various types of metallic objects lie thereon.

FIG. 2 shows an exemplary array of typical metal targets of interest to or frequently encountered by hobbyists and their associated phase delays radially plotted with respect to Cartesian axes as is customary in the art. The phase delay for ferrite powder is defined as zero degrees, and the phase delays for other metallic objects are measured from this zero degree reference. For instance, ferrous soil and nickels have a relatively small phase delay difference from the standard ferrite powder, whereas copper pennies and quarters have respectively greater phase delay differences.

The detector 10 incorporates a function of "discrimination level" (line "DL", FIG. 3) which may be set, defining upper and lower discrimination regions $R_L$ and $R_U$ on the phase delay scale. The line DL partitions the phase delay scale (e.g. between pull tabs and zinc pennies) so that types of metal objects with phase delays above the discrimination level, in the upper discrimination region $R_U$ (e.g. copper pennies, quarters) are reported to the user while types of metal objects with phase delay differences below the discrimination level, in the lower discrimination region $R_L$ (e.g. nickels, foil and iron) are not reported to the user. This methodology is somewhat satisfactory, but has the important disadvantage that a scale based on physics does not necessarily correlate with the user's increasing (or decreasing) interest in the metal objects. For example pull tabs are higher on the phase delay difference scale than are nickels, but people usually perceive nickels to be of more interest than pull tabs. Setting the discrimination level DL to accept nickels will also result in the acceptance of pull tabs. This is undesirable to metal detector users as it often results in their wasting time and effort in digging up uninteresting and valueless metallic objects if nickels are targets of interest to them.

The present invention recognizes both of what are defined herein as type A and type B targets. A "type A" target is one that falls above the discrimination level, in the upper discrimination region $R_U$, and would therefore be reported to the user. However, the user would rather the detector reject and therefore not report the type A target. A typical example of a type A target is a copper penny. For example, a user might wish to set the discrimination level DL as shown in FIG. 3 so that rare zinc pennies are reported, but not be interested in copper pennies but be interested in quarters, silver dollars, etc.

On the other hand, a "type B" target is one that falls below the discrimination level in the discrimination region $R_L$ and would therefore not be reported to the user; however, the user would rather the detector report the type B target. A typical example of a type B target is a nickel. For example, a user again might wish to set the discrimination level DL as shown in FIG. 3, thus rejecting pull tabs, foil, and iron nails, but still wish to have nickels be reported.

Figure 3:
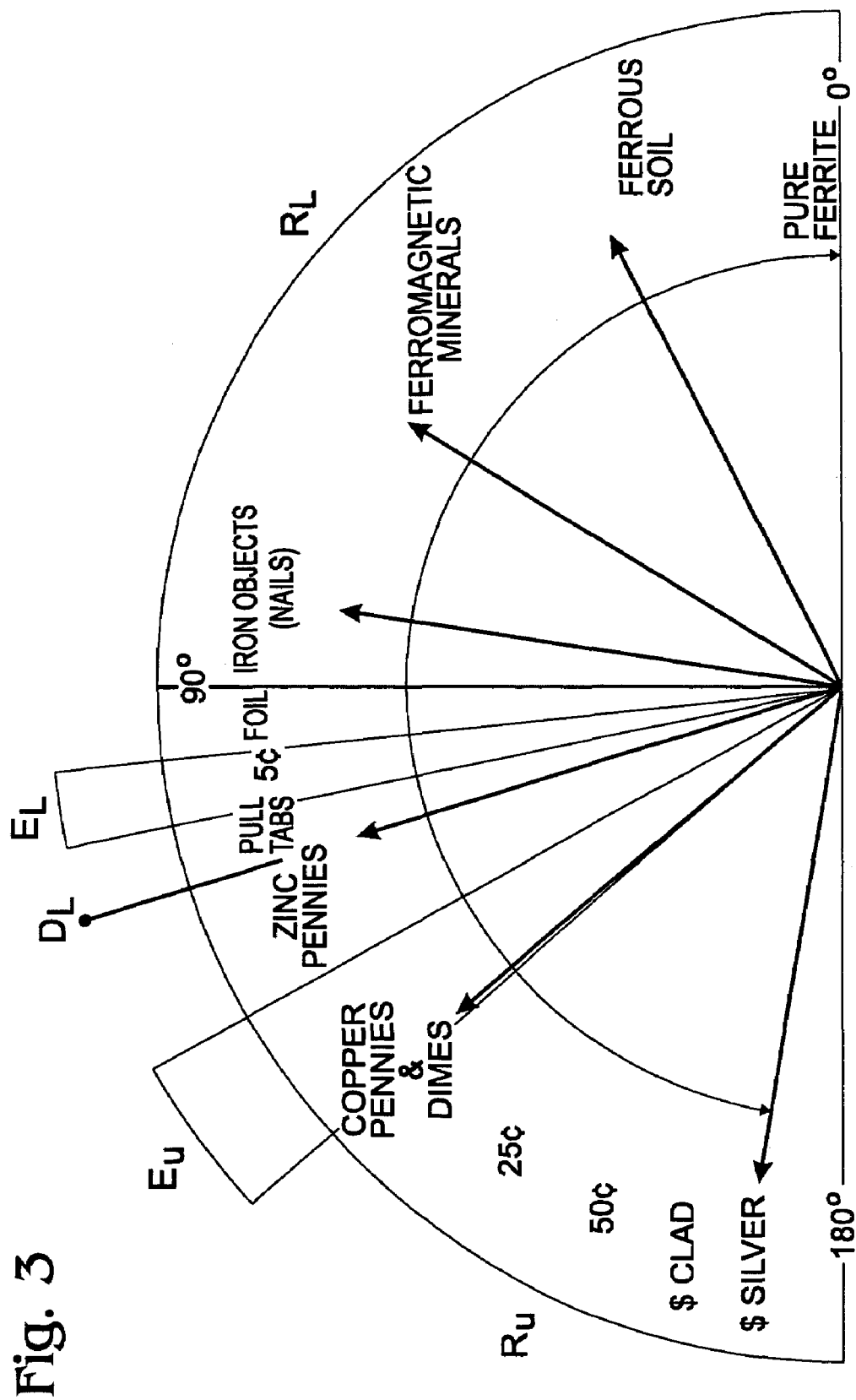
FIG. 3 is a diagram of a phase delay scale plotted with respect to Cartesian axes showing where various types of metallic objects lie thereon, where one set of a possible discrimination level and two exception space settings are demonstrated.

Referring to FIG. 3, in a preferred embodiment of the metal detector 10, the upper discrimination region $R_U$ defines a region of the phase delay scale of acceptance of a metal target whose phase delay falls therein, and therefore a state of the metal detector 10 in which the analyzing module 18 reports a characterization of the target to the user by the interface 20 (hereinafter "accept" state).

Conversely, the lower discrimination region $R_L$ defines a region of the phase delay scale of rejection of a metal target whose phase delay falls therein, and therefore a region in which the analyzing module 18 does not report a characterization of the target to the user (hereinafter "reject" state).

According to the invention, an exception circuit 22 (FIG. 1) is provided in the metal detector 10 that defines at least upper and lower exception spaces $E_U$ and $E_L$ of the phase delay difference scale, the upper and lower exception spaces $E_U$ and $E_L$ respectively falling within the upper and lower discrimination regions $R_U$ and $R_L$ as is illustrated in FIG. 3.

It should be understood that there may be more than two discrimination regions, more than one exception space within a discrimination region, and the exception spaces may be of varying widths or locations on the phase delay different scale. It should also be understood that, even though it is typical that the upper discrimination region defines a region of acceptance and the lower discrimination region defines a region of rejection, any discrimination region may be used to define either.

Figure 4:
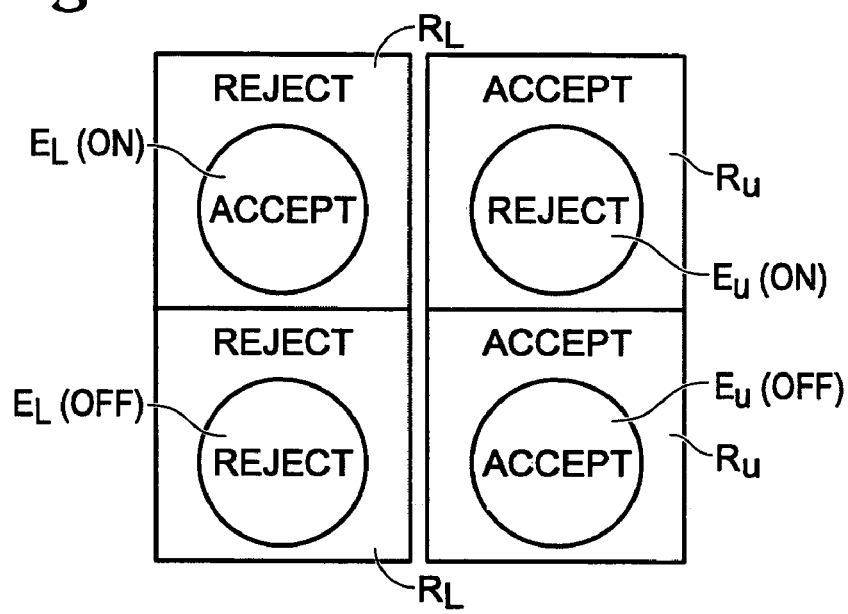
FIG. 4 is a block diagram illustrating the interplay of discrimination level and exception spaces.

The exception spaces $E_U$ and $E_L$ define states of the metal detector 10 wherein, for targets having phase delays falling within the exception space, the state of the metal detector is toggled. Therefore, with respect to FIG. 4, if the upper exception space $E_U$ is active ("ON") the circuit 22 toggles the state of the metal detector 10 from the "accept" state to the "reject" state, and if the lower exception space $E_L$ is ON, the circuit 22 toggles the state of the metal detector from the "reject" state to the "accept" state.

Conversely, if an exception space $E_U$ or $E_L$ is not active ("OFF"), the detector 10 remains in the states defined by the respective discrimination regions.

Preferably a single bipolar switch 24 (FIG. 1) simultaneously activates or deactivates all exception spaces, in this example the upper and the lower exception spaces. Thus, if a detected object is reported to the user when the exception circuit is off, the user can simply switch the exception circuit on and see if the report disappears, which would indicate that the object is of Alternatively, if the user desires to search for objects that would normally not be reported due to their phase delay being in the unreported range, simply turning on the exception circuit would enable this to be done while still receiving reports corresponding to all portions other than $E_u$ of the upper discrimination region $R_u$. Each exception space may also be independently selectable such as by independent switches without departing from the principles of the invention.

As the operator scans the ground or whatever is being searched with the metal detector and a metallic object comes within range of the detector, the detector determines from the amplitude of the received signal that a metallic object is present, and from the phase delay of the received signal the detector determines at what point on the phase delay scale the object's characteristic phase delay is situated. The detector determines where the phase delay of the detected object lies with respect to the preset discrimination level. At this point the detector determines if the exception space function has been activated. With no exception space function activated, the detector reaction is simply defined by the phase delay of the object relative to the discrimination level, the detector normally accepting the detected object and reporting to the user if the phase delay is above the discrimination level and not accepting or reporting if the phase delay is below the discrimination level.

If the exception space function has been activated, further steps are taken by the detector prior to reporting to the user. The detector determines where the phase delay of the detected object lies in relation to the exception spaces. If the phase delay is above the discrimination level, and not within an exception space, the detected object is accepted and reported to the operator. If the phase angle delay value is above the discrimination level, but does lie within the exception space, the object is not accepted or reported to the user. Similarly, if the phase delay of the detected object is below the discrimination level and is not within the exception space, the object is not accepted or reported to the user, but if it is also within the exception space, it is accepted and reported to the user. Therefore the exception spaces in a preferred embodiment of the invention simply invert the normal response of the detector for those portions of the phase delay scale in which the exception spaces lie. Thus, according to the invention the usual mode of accepting and reporting objects with phase delays above the discrimination level and not accepting or reporting objects with phase delays below the discrimination level is sometimes reversed when the operator so chooses.

It should be understood that the discrimination level and exception spaces may be settable by the detector user at the time of operation as well as being preset in the detector unit. However for simplicity and ease of operation, it is preferable to have preset definitions.

Use of a metal detector incorporating these features thus provides the detector with enhanced utility in the reporting of detected metallic objects in that more useful information about the detected metallic object is provided to the user.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow. It will doubtless be obvious to those of ordinary skill in the art that there are other embodiments employing these principles that are not described in detail herein.

The invention claimed is:

1. A metal detector, comprising:
   a transmitting module for transmitting a time-varying electromagnetic wave to the target;
   a receiving module for receiving said wave as modified by the target;
   an analyzing module for determining a phase delay of the modified said wave, comparing said phase delay to a selected discrimination level defining first and second discrimination regions, and defining, in a normal mode of operation of the metal detector where said phase delay is in said first discrimination region, an "accept" state of the metal detector wherein the metal detector reports a characterization of the target to a user and, where said phase delay is in said second discrimination region, a "reject" state of the metal detector wherein the metal detector does not report a characterization of the target to the user; and
   an exception space circuit cooperating with said analyzing module for causing, in a selectable exception space mode of operation of the metal detector where said phase delay falls within a first selected range within said first discrimination region, the metal detector to be placed in said "reject" state.

2. The metal detector of claim 1, wherein said exception space circuit is further adapted for causing, in said exception space mode of operation of the metal detector where said phase delay falls within a second selected range within said second discrimination region, the metal detector to be placed in said "accept" state.

3. The metal detector of claim 2, wherein said exception space circuit is further adapted for causing, in said exception space mode of operation of the metal detector where said phase delay falls within a third selected range within said first discrimination region distinct from said first range, the metal detector to be placed in said "reject" state.

4. The metal detector of claim 3, wherein said exception space circuit is further adapted for causing, in said exception space mode of operation of the metal detector where said phase delay falls within a fourth selected range within said second discrimination region distinct from said second range, the metal detector to be placed in said "accept" state.

5. The metal detector of claim 1, wherein said exception space circuit is further adapted for causing, in said exception space mode of operation of the metal detector where said phase delay falls whithin a second selected range within said first discrimination region distinct from said first range, the metal detector to be placed in said "reject" state.

6. The metal detector of claim 5, wherein said exception space mode of operation of the metal detector is selectable by operation of a single bipolar switch.

7. The metal detector of claim 4, wherein said exception space mode of operation of the metal detector is selectable by operation of a single bipolar switch.

8. The metal detector of claim 3, wherein said exception space mode of operation of the metal detector is selectable by operation of a single bipolar switch.

9. The metal detector of claim 2, wherein said exception space mode of operation of the metal detector is selectable by operation of a single bipolar switch.

10. The metal detector of claim 1, wherein said exception space mode of operation of the metal detector is selectable by operation of a single bipolar switch.

11. A method for metal detecting, comprising:
transmitting a time-varying electromagnetic wave to the target;
receiving said wave as modified by the target;
determining a phase delay of the modified said wave;
comparing said phase delay to a selected discrimination level defining first and second discrimination regions;
defining, in a normal mode of operation of the metal detector where said phase delay is in said first discrimination region, an "accept" state of the metal detector wherein the metal detector reports a characterization of the target to a user and, where said phase delay is in said second discrimination region, a "reject" state of the metal detector wherein the metal detector does not report a characterization of the target to the user; and
selecting an exception space mode of operation of the metal detector by which, if said phase delay falls within a first selected range within said first discrimination region, the method further includes placing the metal detector in said "reject" state.

12. The method of claim 11, wherein, in said exception space mode of operation of the metal detector and if said phase delay falls within a second selected range within said second discrimination region, the method further includes placing the metal detector in said "accept" state.

13. The method of claim 12, wherein, in said exception space mode of operation of the metal detector and if said phase delay falls within a third selected range within said first discrimination region distinct from said first range, the method further includes placing the metal detector in said "reject" state.

14. The method of claim 13, wherein, in said exception space mode of operation of the metal detector and if said phase delay falls within a fourth selected range within said second discrimination region distinct from said second range, the method further includes placing the metal detector in said "accept" state.

15. The method of claim 11, wherein, in said exception space mode of operation of the metal detector and if said phase delay falls within a second selected range within said first discrimination region distinct from said first range, the method further includes placing the metal detector in said "reject" state.

16. The method of claim 15, further comprising selecting said exception space mode of operation of the metal detector by operation of a single bipolar switch.

17. The method of claim 14, further comprising selecting said exception space mode of operation of the metal detector by operation of a single bipolar switch.

18. The method of claim 13, further comprising selecting said exception space mode of operation of the metal detector by operation of a single bipolar switch.

19. The method of claim 12, further comprising selecting said exception space mode of operation of the metal detector by operation of a single bipolar switch.

20. The method of claim 11, further comprising selecting said exception space mode of operation of the metal detector by operation of a single bipolar switch.

* * * * *